US009152358B2

(12) United States Patent
Tomomatsu et al.

(10) Patent No.: US 9,152,358 B2
(45) Date of Patent: Oct. 6, 2015

(54) PRINTER, PRINT PROCESSING PROGRAM, AND PRINT PROCESSING METHOD (75) Inventors: Yoshitsugu Tomomatsu, Nagoya (JP); Junya Kawai, Nagoya (JP); Nako Yoshimura, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/595,606

(22) Filed: Aug. 27, 2012

(65) Prior Publication Data

US 2013/0050757 A1    Feb. 28, 2013

(30) Foreign Application Priority Data

Aug. 29, 2011  (JP) .................. 2011-185876

(51) Int. Cl.
*G06F 3/12* (2006.01)

(52) U.S. Cl.
CPC .............. *G06F 3/1211* (2013.01); *G06F 3/126* (2013.01); *G06F 3/1228* (2013.01); *G06F 3/1284* (2013.01)

(58) Field of Classification Search
None
See application file for complete search history.

(56) References Cited

U.S. PATENT DOCUMENTS

| 7,889,370 | B2 * | 2/2011 | Honda et al. ................. 358/1.15 |
| 8,289,548 | B2 | 10/2012 | Kato et al. |
| 2003/0225971 | A1 | 12/2003 | Oishi et al. |
| 2004/0246762 | A1 | 12/2004 | Inada |
| 2006/0200629 | A1 | 9/2006 | Oishi et al. |
| 2009/0059281 | A1 * | 3/2009 | Murahashi et al. .......... 358/1.15 |
| 2009/0213421 | A1 | 8/2009 | Kato et al. |
| 2011/0075181 | A1 | 3/2011 | Inada |
| 2011/0242629 | A1 | 10/2011 | Inada |
| 2012/0188578 | A1 | 7/2012 | Inada |
| 2013/0321868 | A1 | 12/2013 | Inada |

FOREIGN PATENT DOCUMENTS

| CN | 1300711 | 2/2007 |
| CN | 100339841 | 9/2007 |
| CN | 101515222 | 8/2009 |

(Continued)

OTHER PUBLICATIONS

European Search Report issued in Application No. 12182177.1 on Oct. 28, 2013.

(Continued)

*Primary Examiner* — Ashish K Thomas
*Assistant Examiner* — Keara Harris
(74) *Attorney, Agent, or Firm* — McCarter & English, LLP; Gerald Levy (57) ABSTRACT

This disclosure discloses a printer comprising a USB port, memory, a printing device, and a processor configured to control the printing device and the memory, wherein the regular storage area includes a first memory area, and at least a second memory area in which at least an instruction file including the print data, and wherein, the processor executes a plurality of processing while concurrently performing at least one processing thereof, the plurality of processing including file write processing for updating a content of original instruction file stored in the second memory area by writing the instruction file in the second memory area, update preparation processing for enabling to be updated later a content of the instruction file stored in the second memory area, and print processing for making the printing device execute printing of print data corresponding to the instruction file written in the second memory area.

12 Claims, 5 Drawing Sheets

(56) References Cited

FOREIGN PATENT DOCUMENTS

| | | |
|---|---|---|
| EP | 2 093 660 | 8/2009 |
| JP | 1992-166876 A | 12/1993 |
| JP | 08337014 | 12/1996 |
| JP | 2005-269198 A | 9/2005 |
| JP | 2009-059019 A | 3/2009 |
| JP | 2009-223874 A | 10/2009 |
| JP | 2009-223874 A | 4/2011 |
| JP | 2010-219689 A | 4/2012 |
| JP | 2011-138255 A | 1/2013 |

OTHER PUBLICATIONS

Office Action issued on Japanese Application No. 2011-185876 on Dec. 25, 2014.

Office Action issued on Chinese Application No. 201210313903.6 on Dec. 2, 2014.

Japan Office Action for Application No. 2011-00155 issued on Jul. 6, 2015.

Chinese Office Action issued in Chinese Application No. 201210313903.6 on Jul. 27, 2015.

* cited by examiner

FIG. 5E

PRINTER, PRINT PROCESSING PROGRAM, AND PRINT PROCESSING METHOD

CROSS-REFERENCE TO RELATED APPLICATION

The present application claims priority from Japanese Patent Application No. 2011-185876, which was filed on Aug. 29, 2011, the disclosure of which is incorporated herein by reference in its entirety.

BACKGROUND

1. Field

The present disclosure relates to a printer which performs printing based on operation in a host connected to a USB port, and to a print processing program and a print processing method which are executed in the printer.

2. Description of the Related Art

A printer which performs printing based on operation in a host connected to a USB port has been known. In the printer of a prior art, the host connected to the USB port is made to recognize a regular storage area of memory as a removable drive, which is a device of a USB mass storage class. Consequently, an executable file of an application program stored in a first memory area of the regular storage area becomes readable by the host using regular access operation from the host. Additionally, an instruction file including print data produced with the application program on the host is written in a second memory area of the regular storage area by regular access from the host.

Meanwhile, a processor provided in the printer writes the instruction file received from the host in the second memory area to thereby overwrite and update (file write processing). After performing the file write processing, the processor analyzes the written instruction file to extract print data as well as developing the print data in a print buffer area (data development processing). Additionally, printing device provided in the printer executes printing based on the print data developed in the print buffer area. As a result of this, even if the application program and a device driver are not installed in the host, printing using the application program can be performed from the host.

SUMMARY

An object of the present disclosure is to provide a printer, a print processing program, and a print processing method which can achieve rapid print processing when printing is performed based on operation in a host connected to a USB port.

In order to achieve the above-mentioned object, according to the first aspect, there is provided a printer comprising a USB port, memory having a regular storage area which a host connected to the USB port is able to recognize as a removable drive, a printing device configured to perform printing based on print data produced by an application program, and a processor configured to control the printing device and the memory, wherein the regular storage area includes a first memory area in which an executable file of the application program is stored, and at least a second memory area in which at least an instruction file including the print data is able to be written, and wherein when the executable file of the application program is read and executed by the host, the processor executes a plurality of processing while concurrently performing at least one processing thereof for the instruction files, the plurality of processing including file write processing for updating a content of original instruction file stored in the second memory area by writing the instruction file received from the host in the second memory area, update preparation processing for enabling to be updated later a content of the instruction file stored and held in the second memory area after the file write processing ends, and print processing for making the printing device execute printing of print data corresponding to the instruction file written in the second memory area by the file write processing.

In order to achieve the above-mentioned object, according to the second aspect, there is provided a non-transitory recording medium capable of reading by a computer device storing a print processing program making a computing device which controls a printing device and memory execute a plurality of steps while concurrently performing at least one step thereof for plurality of instruction files, the computing device, the printing device, and the memory comprised in a printer, the memory having a regular storage area which a host connected to a USB port is able to recognize as a removable drive, the printing device being configured to perform printing based on print data produced by an application program, wherein the regular storage area includes a first memory area in which an executable file of the application program is stored, and at least a second memory area in which at least the instruction file including the print data is able to be written, when the executable file of the application program is read and executed by the host, the plurality of steps including a file write step for updating a content of original instruction file stored in the second memory area by writing the instruction file received from the host in the second memory area, an update preparation step for enabling to be updated later a content of the instruction file stored and held in the second memory area after the file write step ends, and a print step for making the printing device execute printing of print data corresponding to the instruction file written in the second memory area by the file write step.

In order to achieve the above-mentioned object, according to the third aspect, there is provided a print processing method executed by a printer that includes memory having a regular storage area which a host connected to a USB port is able to recognize as a removable drive, and a printing device configured to perform printing based on print data produced by an application program, wherein the regular storage area includes a first memory area in which an executable file of the application program is stored, and at least a second memory area in which at least an instruction file including the print data is able to be written, when the executable file of the application program is read and executed by the host, the print processing method executing a plurality of steps while concurrently performing at least one step thereof for the instruction files, the plurality of steps including a file write step for updating a content of original instruction file stored in the second memory area by writing the instruction file received from the host in the second memory area, an update preparation step for enabling to be updated later a content of the instruction file stored and held in the second memory area after the file write step ends, and a print step for making the printing device execute printing of print data corresponding to the instruction file written in the second memory area by the file write step.

DETAILED DESCRIPTION OF THE PREFERRED EMBODIMENTS

Hereinafter, one embodiment of the present disclosure will be described referring to drawings.

<Schematic Configuration of Printer>

Figure 1:
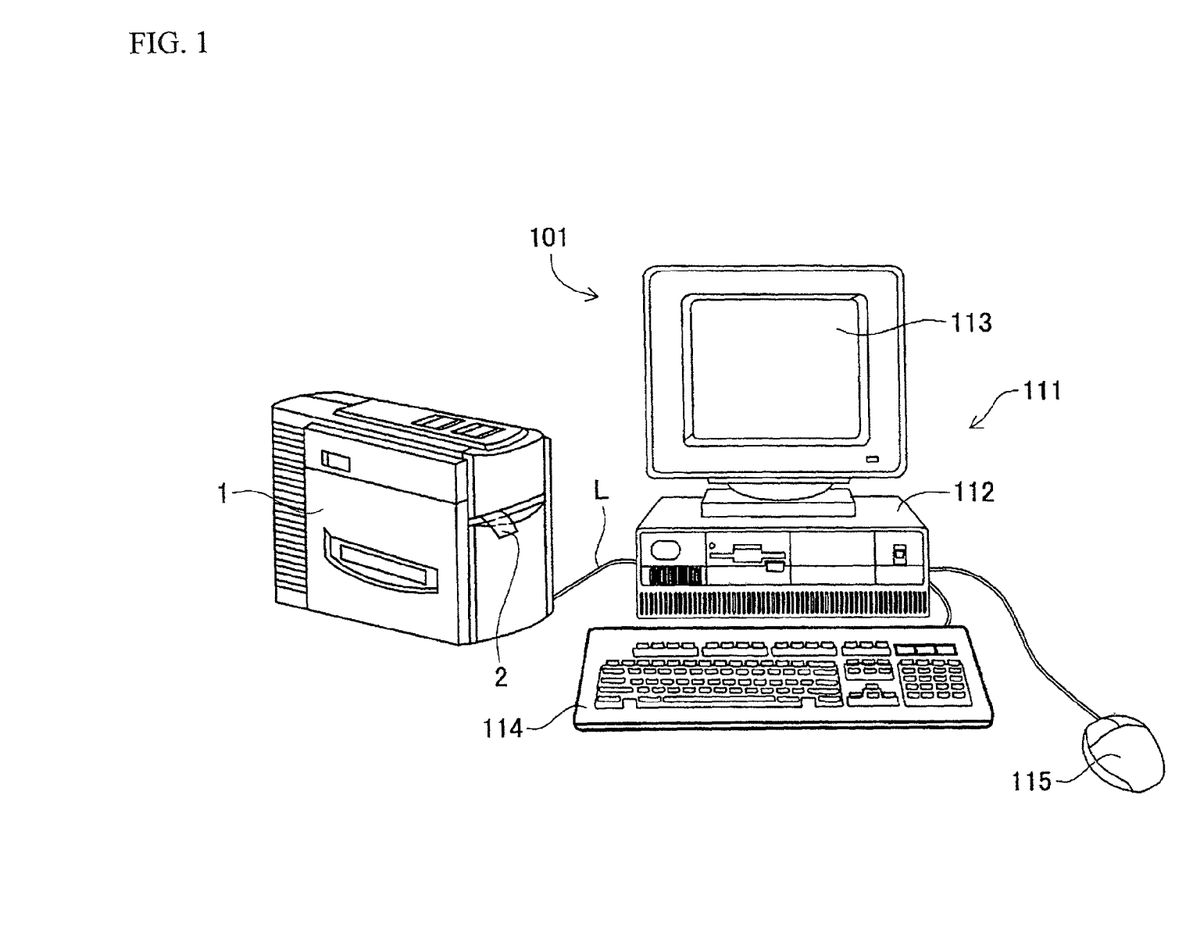
FIG. 1 is a system configuration view showing a state where a printer according to one embodiment of the present disclosure is connected to a personal computer.

As shown in FIG. 1, a printer 1 of the embodiment forms a printing system 101 by being connected to a personal computer 111 through a USB cable L. In this example, the printer 1 is a so-called label printer which performs printing on a print tape 2. In addition, the personal computer 111 works as a host of the printing system 101, and is a desktop computer provided with a body 112, a display 113, a keyboard 114, and a mouse 115, etc.

<Internal Configuration of Printer>

Figure 2:
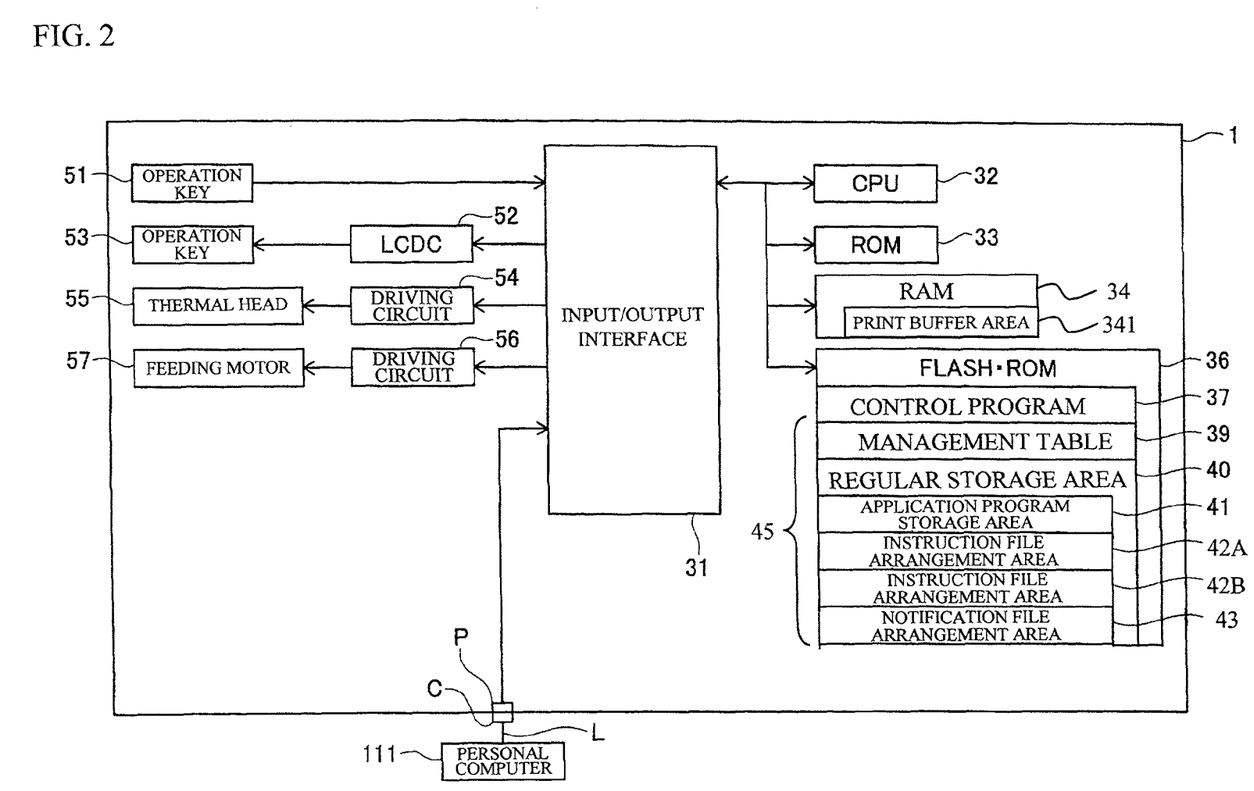
FIG. 2 is a functional block diagram showing an electrical configuration of the printer.

Next, an electrical configuration of the printer 1 will be described referring to FIG. 2. As shown in FIG. 2, the printer 1 has an input/output interface 31, a CPU 32, a ROM 33, a RAM 34, and a FLASH/ROM 36.

To the input/output interface 31, connected are an operation key 51, a display controller (hereinafter referred to as an "LCDC") 52, two driving circuits 54 and 56, a USB port P, the above described CPU 32, the above described ROM 33, the above described RAM 34, and the above described FLASH-ROM 36 (corresponding to memory set forth in each claim).

The operation key 51 is used to input into the CPU 32 a control signal for making desired various operations by user operation. An LCD 53 is connected to the LCDC 52, and the LCDC 52 is provided with a display RAM (not shown) for displaying display data on the LCD 53. A thermal head 55 is connected to the driving circuit 54, and the driving circuit 54 drives the thermal head 55 in printing print data on the print tape 2. A feeding motor 57 is connected to the driving circuit 56, and the driving circuit 56 drives the feeding motor 57 in feeding the print tape 2 outside.

A connector C of the USB cable L is attached to and detached from the USB port P. Accordingly, the connector C of the USB cable L is inserted in the USB port P, and thereby the personal computer 111 can be connected to the printer 1 with the USB.

The CPU 32 (processor, computing device) executes each program, which will be described hereinafter, etc. It is to be noted that the CPU 32 incorporates cache memory in which a control program other than a program related to printing is stored, etc. In addition, the CPU 32 actuates the driving circuit 54 and 56, etc. by executing a control program 37, which will be described hereinafter, and ejects the print tape 2 outside while printing print data stored in a regular storage area 40, which will be described hereinafter, on the print tape 2. Accordingly, printing device set forth in each claim is configured with two driving circuits 54 and 56, the thermal head 55, the feeding motor 57, etc.

In the ROM 33, a control program other than a program related to printing, etc. is stored. In the RAM 34, provided are a work area used when various control programs are executed in the CPU 32, and a print buffer area 341 in which print data is temporarily stored.

The control program 37 related to printing, and a management table 39, etc. are stored in the FLASH/ROM 36 and further, the regular storage area 40 is provided therein. In the regular storage area 40, provided are an application program storage area 41 (a first memory area), an instruction file arrangement area 42, and a notification file arrangement area 43.

The management table 39 manages write in the regular storage area 40 in the FLASH/ROM 36 by a USB standard specification. Namely, the management table 39 makes the personal computer 111 connected to the USB port P recognize the regular storage area 40 in the FLASH/ROM 36 as a removable drive.

The application program storage area 41 is, for example, fixed allocation of a part of the regular storage area 40 in the FLASH/ROM 36. In the application program storage area 41, an executable file 200 (refer to FIG. 3, which will be described hereinafter) of an application program is stored. It is to be noted that the application program is software developed as a dedicated editor (printed label editing application) for the printer 1 according to the embodiment.

The instruction file arrangement area 42 is allocation of a part of the regular storage area 40 in the FLASH/ROM 36 by the management table 39. As a feature of the embodiment, a plurality of (two in this example) instruction file arrangement areas 42A and 42B are provided. One instruction file 202 (refer to FIG. 3, which will be described hereinafter) is stored in each of the instruction file arrangement areas 42A and 42B (second memory areas), respectively. It is to be noted that the instruction file 202 is the file generated by the application program, includes a printing instruction command, and further includes print data produced with the above described application program.

The notification file arrangement area 43 is allocation of a part of the regular storage area 40 in the FLASH/ROM 36 by the management table 39. A notification file 203 (refer to FIG. 3, which will be described hereinafter) is stored in the notification file arrangement area 43. It is to be noted that the notification file 203 includes status information of the printer 1 according to the embodiment.

The print buffer area 341 is allocated on the RAM 34, and the print buffer area 341 temporarily stores print data extracted from the above described instruction file 202 (a detailed function will be described hereinafter).

Accordingly, the management table 39 and the regular storage area 40 of the FLASH/ROM 36 work as a mass storage area 45 of the USB standard specification.

<Content of Control Processing>

In the embodiment of the above described configuration, as one of the features, the personal computer 111 divides one instruction file to generate a plurality of instruction files, sequentially transmits the plurality of instruction files to the printer 1, and print processing of the corresponding print data is performed. Hereinafter, a content of the processing will be described using FIG. 3.

Figure 3:
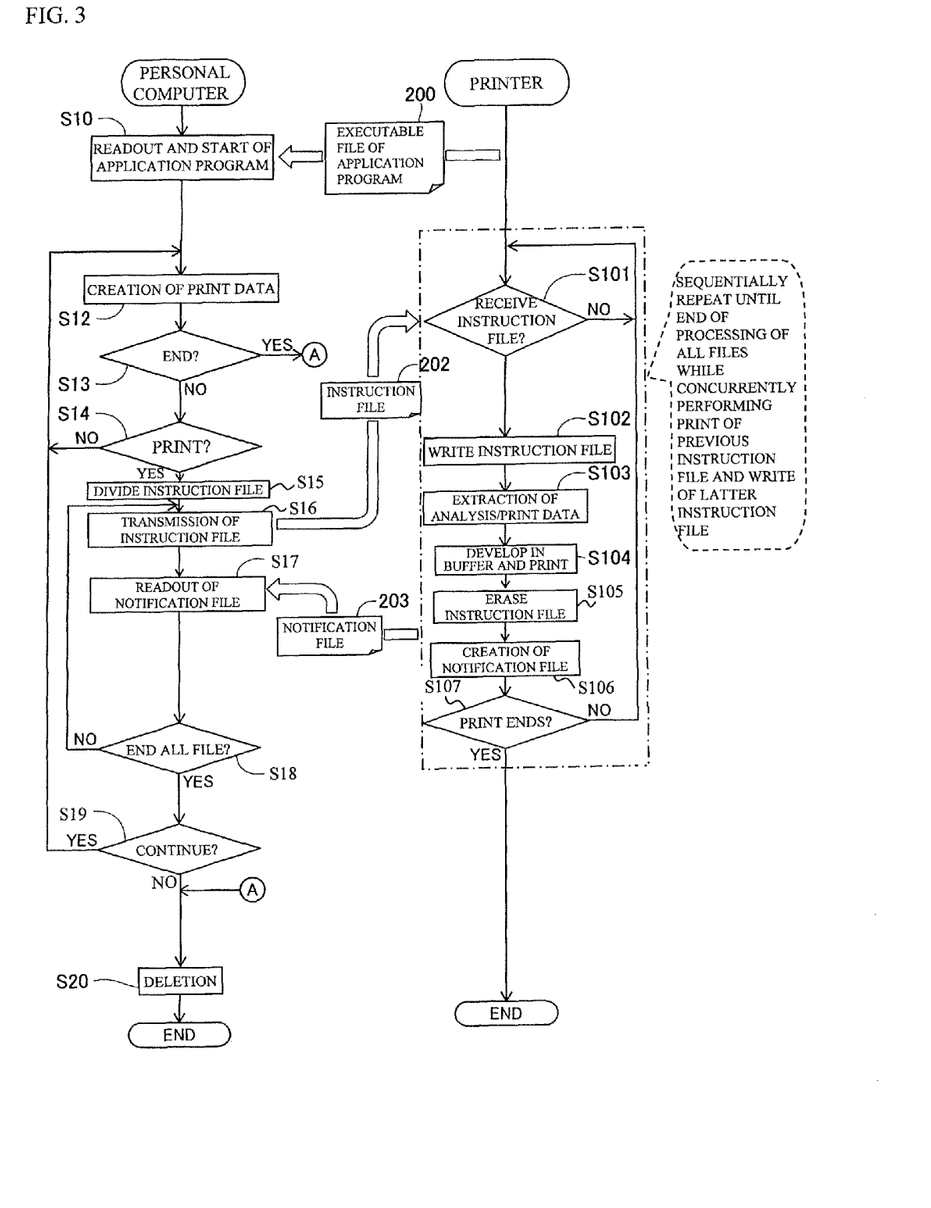
FIG. 3 is a sequence chart showing contents of operation control of the printer and the personal computer.

In FIG. 3, first, when connected to the printer 1 with the USB, the personal computer 111 recognizes the regular storage area 40 in the FLASH/ROM 36 of the printer 1 as a removable drive as described above. Additionally, in step S10, by a user performing suitable operation, the personal computer 111 accesses the above described application program storage area 41 of the regular storage area 40 of the printer 1, reads the executable file 200 of an application program stored in the application program storage area 41, and starts the application program.

Subsequently, the program proceeds to step S12, and the personal computer 111 produces print data to be printed by the printer 1 using the above described application program (dedicated editor) by the user performing suitable operation.

Additionally, in step S13, the personal computer 111 determines whether or not end of the above described application program has been instructed by user's suitable operation. If the end of the application program has been instructed, determination is satisfied (S13: YES), and the program proceeds to step S20, which will be described hereinafter. Meanwhile, if the end of the application program has not been instructed, determination is not satisfied (S13: NO), and the program proceeds to S14.

In step S14, the personal computer 111 determines whether or not execution of print in the printer 1 has been instructed by user's suitable operation. If execution of print has not been instructed, determination of step S14 is not satisfied (S14: NO), and the program returns to the above described step S12 and repeats a similar procedure. If execution of print has been instructed, determination of step S14 is satisfied (S14: YES), and the program proceeds to step S15.

In step S15, the personal computer 111 generates one instruction file including a printing instruction command to the printer 1, print data produced in the above described step S12, etc. using the above described application program, as well as dividing the instruction file into a plurality of files. It is to be noted that the above described printing instruction command and print data (with a smaller capacity than the print data before divided) are included in each of the plurality of divided instruction files. Subsequently, the program proceeds to step S16.

In step S16, one instruction file (one instruction file which serves as a processing target at this point according to a predetermined order) 202 is transmitted to the printer 1 among the plurality of instruction files generated by dividing one instruction file in the above described step S15.

The CPU 32 of the printer 1 responds to the above, and determines whether to have received the above described instruction file 202 from the personal computer 111 in step S101. If the CPU 32 has not received the instruction file 202 from the personal computer 111, determination is not satisfied (S101: NO), and a loop is waiting until determination is satisfied. If the CPU 32 has received the instruction file 202 from the personal computer 111, determination of step S101 is satisfied (S101: YES), and the program proceeds to step S102.

In step S102, the CPU 32 writes the instruction file 202 received in step S101 in the above described instruction file arrangement area 42A (or 42B) of the above described regular storage area 40, and thereby a stored content is updated (corresponding to file write processing set forth in each claim). Namely, if nothing is stored in the instruction file arrangement area 42A (or 42B), an instruction file 202 is newly written, and if the instruction file 202 has been already stored in the instruction file arrangement area 42A (or 42B), it is overwritten and updated with the new instruction file 202. It is to be noted that the step S102 corresponds to a file write procedure set forth in each claim. Subsequently, the program proceeds to step S103.

In step S103, the CPU 32 analyzes the instruction file 202 written in the instruction file arrangement area 42A (or 42B) in the above described step S102, and extracts the above described print data included in the instruction file 202. Subsequently, the program proceeds to step S104.

In step S104, the CPU 32 develops the print data extracted from the instruction file 202 in the above described step S103 in the above described print buffer area 341 of the above described RAM 34 (corresponding to data development processing set forth in each claim). The CPU 32 actuates the driving circuits 54 and 56, etc. according to the control program 37 related to printing stored in the above described FLASH/ROM 36 as mentioned above based on the print data developed in the print buffer area 341 by the data development processing, and makes the printing device execute printing on the print tape 2 (corresponding to print processing set forth in each claim). It is to be noted that this procedure corresponds to a print procedure set forth in each claim. If data development processing of step S104 ends, the program proceeds to step S105.

In step S105, the CPU 32 erases the instruction file 202 which has been written and held in the instruction file arrangement area 42A (or 42B) for development processing of the above described step S104 (since processing to the print buffer area 341 has ended).

Subsequently, in step S106, the CPU 32 produces the notification file (erasure notification) 203 including erasure completion information indicating completion of erasure of the instruction file 202 in the above described step S105 (corresponding to update preparation processing set forth in each claim), and overwrites and stores the produced notification file 203 in the notification file arrangement area 43 of the above described regular storage area 40. This procedure corresponds to an update preparation procedure set forth in each claim. It is to be noted that identification information (not shown) indicating which processing of the instruction files 202 the identification information corresponds to is included in each notification file 203. In addition, in a case where the CPU 32 determines that a print speed in print processing is increased and thereby sufficient USB operation cannot be performed when the development processing in the print buffer area 341 is performed, it may be set that production of the above described notification file 203 is not performed (or a production timing is delayed).

Subsequently, the CPU 32 determines whether or not print processing has ended in step S107. Namely, as will be described hereinafter, by repeating steps S101 to S106, it is determined whether or not print processing based on all the instruction files 202 generated by the above described division has completed, and whether or not print processing of the print data generated in the above described step S12 has ended. Determination of step S107 is not satisfied (S107: NO) until the print processing ends, the program returns to step S101, and processing of steps S101 to S106 is repeated. If the print processing ends, determination of step S107 is satisfied (S107: YES), and a flow of a printer 1 side is ended. It is to be noted that a program which executes the above described control procedure is stored in the above described ROM 33 in the printer 1.

Meanwhile, in response to the processing of the above described step S106 of the CPU 32 of the printer 1, the personal computer 111 accesses the notification file arrangement area 43 of the above described regular storage area 40 in step S17, and reads the above described notification file 203 (erasure notification) from the notification file arrangement area 43. As a result of this, the printer 1 recognizes that analysis of the instruction file 202 transmitted in the above mentioned step S16 and extraction of print data, and the development of the print data in the print buffer area 341 have been completed (in other words, printing using the print data has already been started). Subsequently, the program proceeds to step S18.

In step S18 the personal computer 111 determines whether or not extraction and development in the print buffer area 341 of the above described corresponding print data have been completed as for all the plurality of instruction files generated by dividing one instruction file in the above mentioned step S15 based on a recognition result in step S17. If the above described processing of all the instruction files has not been completed yet, determination of step S18 is not satisfied (S18: NO), the program returns to the step S16 and repeats a similar procedure. Namely, in step S16 which the program has returned in a manner as described above, the CPU 32 transmits the instruction file 202 used as a next processing target in accordance with the above described predetermined order to the printer 1 similarly to the above, and after that, similar processing to the above is performed. In a manner described above, the plurality of instruction files generated by dividing one instruction file in the above mentioned step S15 are sequentially transmitted from the personal computer to the printer 1 (step S16), and in the printer 1, print data is extracted from each instruction file and developed in the print buffer area 341, and print processing is executed (steps S103 and S104). The instruction file is erased, notification of the erasure is performed to the personal computer by the notification file 203 when the above described development processing ends (steps S105, S106, and S17). If the above described processing of all the instruction files is completed by repeating such processing, determination of step S18 is satisfied (S18: YES), and the program proceeds to step S19.

In step S19, the personal computer 111 determines whether to continue the application program. Specifically, similarly in the above described step S13, the personal computer 111 determines whether the end of the above described application program has not been instructed yet by user's suitable operation. If the user does not instruct the end of the application program and the personal computer 111 continues it, determination of step S19 is satisfied (S19: YES), and the program returns to the above described step S12, and repeats a similar procedure. Meanwhile, if the user instructs the end of the application program and the personal computer 111 ends it, determination of step S19 is not satisfied (S19: NO), and the program proceeds to S20.

In step S20, the personal computer 111 ends the above described application program, and deletes the application program. As a result of this, the application program does not remain in the personal computer 111.

Main Part of the Embodiment

In the above described processing, a greatest feature of the printer 1 of the embodiment lies in the fact that when the printer 1 sequentially receives and processes the plurality of instruction files 202 in accordance with the predetermined order by repeating steps S101 to S106 as mentioned above, a subsequent instruction file 202 is written (step S102) while printing of print data based on the precedingly written instruction file 202 is performed (refer to step S104). Namely, (at least a part of) processing regarding the respective plurality of instruction files 202 is concurrently performed. The concurrent processing will be described in detail using FIGS. 4A to 4E.

In FIGS. 4A to 4E, a plurality of (two in this example) instruction file arrangement areas 42A and 42B are provided in the printer 1 of the embodiment. For example, when preceding one instruction file 202 (hereinafter referred to as an "instruction file 1") is received in the above described step S101, the "instruction file 1" is written in the instruction file arrangement area 42A in subsequent step S102 (refer to FIG. 4A).

Subsequently, data development of the "instruction file 1" of the above described instruction file arrangement area 42A is performed in the print buffer area 341 as "print data 1" by processing of the above described steps S103 and S104, the "instruction file 1" in the instruction file arrangement area 42A is erased in the above described step S105 when development ends, and notification of the erasure of the "instruction file 1" is performed to the personal computer 111 by a notification file being produced in step S106 (refer to FIG. 4B).

Subsequently, a next instruction file 202 (hereinafter referred to as an "instruction file 2") is received from the personal computer 111 in the above described step S101 in response to the above mentioned erasure notification while printing is started and executed with the "print data 1" of the print buffer area 341 developed as described above, and the received instruction file 202 is written in the above described step 102 in the instruction file arrangement area 42A which is in a state where nothing is stored by the above described erasure (refer to FIG. 4C).

Additionally, after print processing of the "print data 1" of the print buffer area 341 ends, data development of the "instruction file 2" of the above described instruction file arrangement area 42A is performed in the above described print buffer area 341 as "print data 2" by processing of the above described steps S103 and S104 similarly to the above. The "instruction file 2" in the instruction file arrangement area 42A is erased in the above described step S105 when development ends, and notification of the erasure of the "instruction file 1" is performed to the personal computer 111 by a notification file being produced in step S106 (refer to FIG. 4D).

Subsequently, a further next instruction file 202 (hereinafter referred to as an "instruction file 3") is received from the personal computer 111 in the above described step S101 in response to the above mentioned erasure notification while printing is started and executed with the "print data 2" of the print buffer area 341 developed as described above, and the instruction file 3 is written in the instruction file arrangement area 42A in the above described step S102 (refer to FIG. 4E). After that, the above described processing is executed to the plurality of sequentially received instruction files 202 using the instruction file arrangement area 42A as described above. Additionally, in so doing, as shown in FIGS. 4C and 4E, at least one processing (print processing of the preceding instruction file 202 and file write processing of the subsequent instruction file 202 in this example) is concurrently performed to the plurality of (two in this example) instruction files 202.

It is to be noted that a case of using only two instruction files 42A as shown in FIGS. 4A to 4E in the above, but the present disclosure is not limited to this. Namely, as shown in FIGS. 5A to 5E, the CPU 32 can also sequentially perform the above mentioned file write processing, data development processing, and print processing of the plurality of instruction files, while alternately using the instruction file arrangement area 42A and the instruction file arrangement area 42B. In this case, use of two instruction file arrangement areas 42A and 42B enables a data transmission/reception timing in each of the instruction file arrangement areas 42A and 42B to have enough time and thus, control reliability can be enhanced.

It is to be noted that the present disclosure is not limited to the above described embodiment, and various changes can be performed without departing from the gist of the disclosure. Hereinafter, such modified examples will be described in turn.

(1) In a Case of Making Personal Computer Recognize by Changing File Attribute

In the above described embodiment, the instruction file 202 of the instruction file arrangement area 42A is deleted when development of one instruction file 202 of the instruction file arrangement area 42A in the print buffer area 341 is completed, but the present disclosure is not limited to this.

Figure 4A:
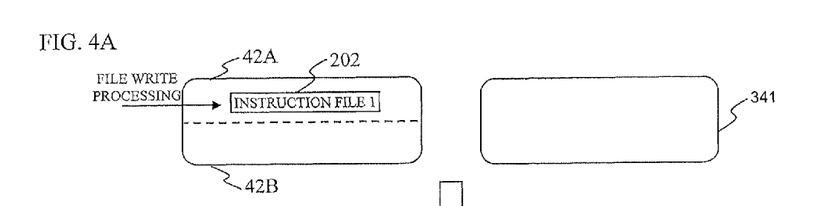
FIG. 4A is an explanatory diagram for explaining processing of instruction files in the printer.
Figure 4B:
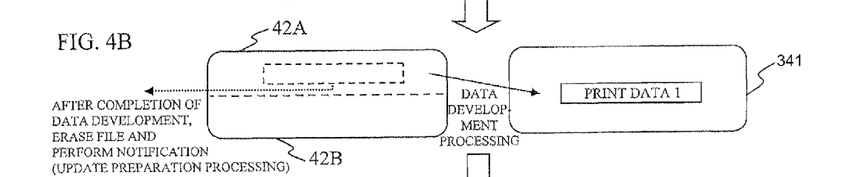
FIG. 4B is an explanatory diagram for explaining processing of instruction files in the printer.
Figure 4C:
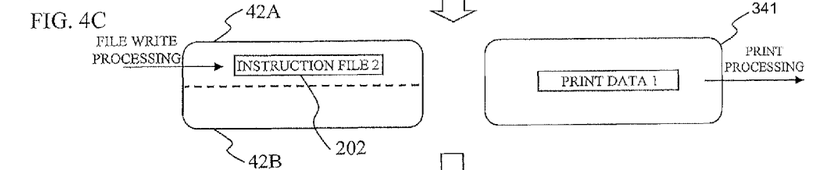
FIG. 4C is an explanatory diagram for explaining processing of instruction files in the printer.
Figure 4D:
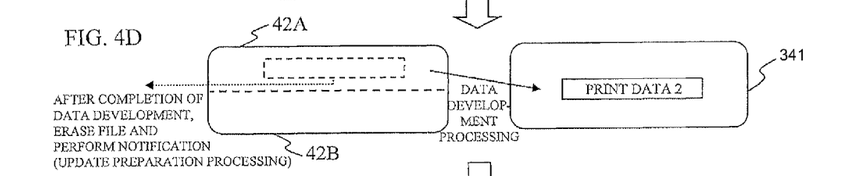
FIG. 4D is an explanatory diagram for explaining processing of instruction files in the printer.
Figure 4E:
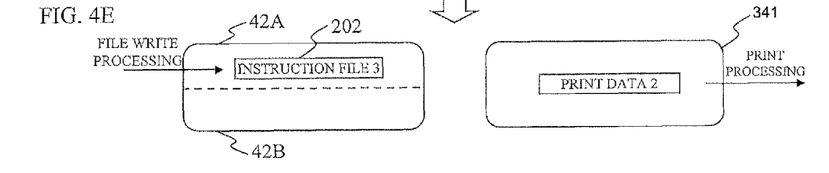
FIG. 4E is an explanatory diagram for explaining processing of instruction files in the printer.
Figure 5A:
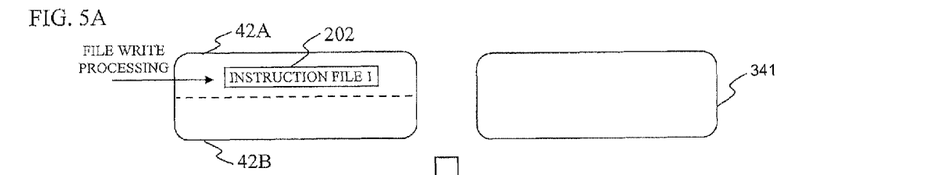
FIG. 5A is an explanatory diagram for explaining another example of processing of instruction files in the printer.
Figure 5B:
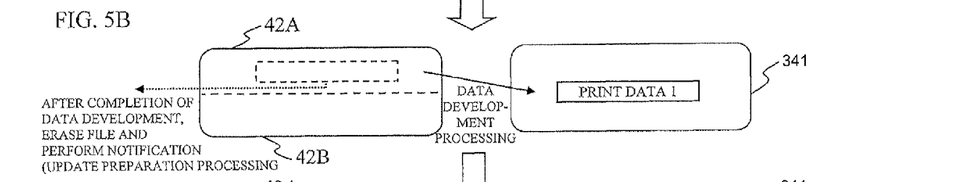
FIG. 5B is an explanatory diagram for explaining another example of processing of instruction files in the printer.
Figure 5C:
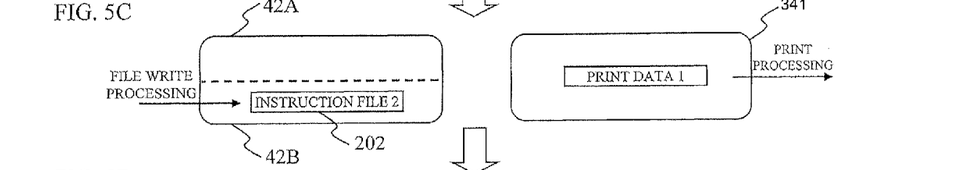
FIG. 5C is an explanatory diagram for explaining another example of processing of instruction files in the printer.
Figure 5D:
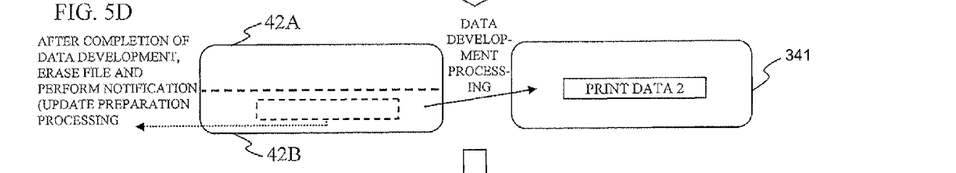
FIG. 5D is an explanatory diagram for explaining another example of processing of instruction files in the printer.
Figure 5E:
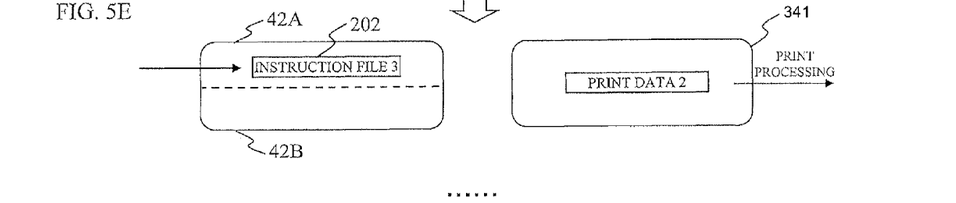
FIG. 5E is an explanatory diagram for explaining another example of processing of instruction files in the printer.

Namely, as shown in FIG. 4A, when one instruction file 202 is first written in the instruction file arrangement area 42A, the instruction file 202 is set to be a certain predetermined file format, and subsequently, as shown in FIG. 4B when the corresponding printing data is developed in the print buffer area 341, the file format is changed instead of the instruction file 202 being erased. Specifically, for example, original contents of produced date and time information, update information, identification information (name), etc. of the instruction file 202 are changed to other contents thereof at the above described timing. In this case, it may be set that the personal computer 111 side periodically reads a format of the instruction file 202, and that the personal computer 111 recognizes that the next instruction file 202 can be written in the instruction file arrangement area 42A by the above described change of the file attribute. Alternatively, it may be set to perform notification of the attribute change of the instruction file 203 to the personal computer 111 side by the above mentioned notification file 203.

Since the personal computer 111 can be reliably notified that the next instruction file can be written in the instruction file arrangement area 42A before printing is actually completed also according to the modified example, an effect similar to the above described embodiment can be obtained.

(2) In a Case of Changing File Attribute from Non-Overwritable to Overwritable

Namely, in the modified example, as an example where the above described change of the file attribute is applied, as shown in FIG. 4A, when one instruction file 202 is first written in the instruction file arrangement area 42A, the instruction file 202 is set to be a read-only file format (overwrite update cannot be performed). Additionally, subsequently, as shown in FIG. 4B, when the corresponding printing data is developed in the print buffer area 341, a file format of the instruction file 202 is changed to (not erased) a file format in which overwrite update can be performed.

In this case as well, an effect similar to the above described modified example (1) can be obtained. In addition, particularly in the modified example, since the instruction file 202 is read only until the end of the data development processing in which print data corresponding to the instruction file 202 is developed in the print buffer area 341, data alteration in the instruction file arrangement area 42A from the personal computer 111 can be reliably forbidden until the end of the data development processing.

(3) In a Case of Performing Print without Developing Data in Print Buffer Area

Namely, in the above, print data extracted by analyzing the instruction file 202 of one of the instruction file arrangement areas 42A and 42B is developed in the print buffer area 341, and the next instruction file 202 is written in the instruction file arrangement areas 42A and 42B while print processing is executed based on the development, but the present disclosure is not limited to this. Namely, the present disclosure may be applied to a case where the instruction files 202 received by being transmitted from the personal computer 111 is print data itself which does not need the above described analysis. In this case, print of the print data of the instruction file 202 written by the above described write processing is executed in print processing. In so doing, processing similar to the above mentioned method is performed except that data development processing into the above described print buffer area 341 is omitted, and write processing of the next instruction file 202 is performed before print processing is completed after the print processing is started based on one instruction file 202, whereby an effect similar to the above can be obtained.

(4) Others

For example, although the printer 1 according to the embodiment is a so-called label printer which performs printing on the print tape 2, it may be the printer which performs printing on a piece of roll-shaped or sheet-shaped printing paper, etc.

In addition, the personal computers 111 connected to the printer 1 through the USB port P may be a tower-type, an all-in-one-type, or a notebook personal computer, or a large-sized computer.

It is to be noted that in the above, arrows shown in FIG. 2 indicate one example of a flow of a signal, and do not limit a flow direction of the signal.

In addition, a sequence shown in FIG. 3 does not limit the present disclosure to a procedure indicated in the above described sequence, and addition, deletion or change of the order of a procedure, etc. may be performed without departing from the gist and a technical idea of the disclosure.

In addition, methods according to the above described embodiment and each modified example may be utilized in suitably combination with each other also other than the methods already described above.

In addition to that, although exemplification is not performed point by point, the present disclosure shall be carried out by various changes being added without departing from the gist of the disclosure.

What is claimed is:

1. A printer comprising:
   a USB port;
   memory having a regular storage area which a host connected to said USB port is able to recognize as a removable drive;
   a printing device configured to perform printing based on print data produced by an application program; and
   a processor configured to control said printing device and said memory, wherein said regular storage area includes:
   a first memory area in which an executable file of said application program is stored; and
   a plurality of second memory areas in which a plurality of instruction files including said print data are able to be written respectively, and wherein
   said memory further includes a print buffer area capable of temporarily storing said print data extracted from said instruction file,
   when the executable file of said application program is read and executed by said host, said processor executes a plurality of processing, said plurality of processing including:
   a first step for executing first file write processing for updating a content of one of the original instruction file stored in any one of the plurality of second memory areas by writing one preceded instruction file received from said host in one said second memory area;

a second step for executing first print data extraction processing for analyzing the one preceded instruction file written in the one second memory area by said first file write processing and extracting said print data corresponding to the preceded instruction file;

a third step for executing first data development processing for developing the print data corresponding to the one preceded instruction file extracted by said first print data extraction processing in said print buffer area and for executing first update preparation processing for enabling to be updated later said one preceded instruction file which is stored and held in said one second memory area while concurrently performing the first data development processing after the data development;

a fourth step for executing first print processing for making said printing device execute printing of said print data corresponding to the one preceded instruction file developed in said print buffer area by said first data development processing and for executing second file write processing for updating a content of the one preceded instruction file into a content of one subsequent instruction file by writing the one subsequent instruction file received from said host in any one of the plurality of said second memory areas while concurrently performing the first print processing, said one preceded instruction file being stored in the one of second memory areas and being capable of updating by said first update preparation processing;

a fifth step for executing second print data extraction processing for analyzing the one subsequent instruction file written in the one second memory area by said second file write processing and extracting said print data corresponding to the subsequent instruction file;

a sixth step for executing second data development processing for developing the print data corresponding to the one subsequent instruction file extracted by said second print data extraction processing in said print buffer area and for executing second update preparation processing for enabling to be updated later said one subsequently instruction file which is stored and held in said one second memory area while concurrently performing the second data development processing after the data development; and, a seventh step for executing second print processing for making said printing device execute printing of said print data corresponding to the one subsequent instruction file developed in said print buffer area by said second data development processing and for executing third file write processing for updating the content of the one subsequent instruction file into a content of a further-subsequent instruction file by writing the one further-subsequent instruction file received from said host in any one of the plurality of said second memory areas while concurrently performing the second print processing, said one subsequent instruction file being stored in the one of second memory areas and being capable of updating by said second update preparation processing.

2. The printer according to claim 1, wherein:
said processor performs, as said update preparation processing, processing of erasing said one instruction file which is stored and held in said one second memory area, and which is regarded as the analysis target, as well as producing a notification file to notify said host of execution of the erasure, when said data development processing ends.

3. The printer according to claim 1, wherein:
said processor performs, as said update preparation processing, processing of changing a file attribute of said one instruction file which is stored and held in said one second memory area, and which is regarded as the analysis target, when said data development processing ends.

4. The printer according to claim 3, wherein:
said processor performs, as said update preparation processing, processing of changing said one instruction file which is stored and held in said one second memory area, and which is regarded as the analysis target, from a read-only file attribute to a readable and writable file attribute, when said data development processing ends.

5. A non-transitory recording medium capable of reading by a computer device storing a print processing program making a computing device which controls a printing device and memory execute a plurality of steps, said computing device, said printing device, and said memory comprised in a printer, said memory having a regular storage area which a host connected to a USB port is able to recognize as a removable drive; said printing device being configured to perform printing based on print data produced by an application program, wherein said regular storage area includes: a first memory area in which an executable file of said application program is stored; and a plurality of second memory area in which at least said instruction files including said print data are able to be written respectively said memory further including a print buffer area capable of temporarily storing said print data extracted from said instruction file, when the executable file of said application program is read and executed by said host, said plurality of steps including:

a first step for executing first file write processing for updating a content of one of the original instruction file stored in any one of the plurality of second memory areas by writing one preceded instruction file received from said host in said one second memory area;

a second step for executing first print data extraction processing for analyzing the one preceded instruction file written in the one second memory area by said first file write processing and extracting said print data corresponding to the preceded instruction file;

a third step for executing first data development processing for developing the print data corresponding to the one preceded instruction file extracted by said first print data extraction processing in said print buffer area and for executing first update preparation processing for enabling to be updated later said one preceded instruction file which is stored and held in said one second memory area while concurrently performing the first data development processing after the data development;

a fourth step for executing first print processing for making said printing device execute printing of said print data corresponding the one preceded instruction file developed in said print buffer area by said first data development processing and for executing second file write processing for updating a content of the one preceded instruction file into a content of one subsequent instruction file by writing the one subsequent instruction file received from said host in any one of the plurality of said second memory areas while concurrently performing the first print processing, said one preceded instruction file being stored in the one of second memory areas and being capable of updating by said first update preparation processing;

a fifth step for executing second print data extraction processing for analyzing the one subsequent instruction file written in the one second memory area by said second file write processing and extracting said print data corresponding to the subsequent instruction file;

a sixth step for executing second data development processing for developing the print data corresponding to that one subsequent instruction file extracted by said second print data extraction processing in said print buffer area and for executing second update preparation processing for enabling to be updated later said one subsequent instruction file which is stored and held in said one second memory area while concurrently performing the second data development processing after the data development; and a seventh step for executing second print processing for making said printing device execute printing of said print data corresponding to the one subsequent instruction file developed in said print buffer area by said second data development processing and for executing third file write processing for updating the content of the one subsequent instruction file into a content of a further-subsequent instruction file by writing the one further-subsequent instruction file received from said host in any one of the plurality of said second memory areas while concurrently performing the second print processing, said one subsequent instruction file being stored in the one of second memory areas and being capable of updating by said second preparation processing.

6. The non-transitory recording medium according to claim 5, wherein:

in said update step, processing of erasing said one instruction file which is stored and held in said one second memory area, and which is regarded as the analysis target, is performed as well as producing a notification file to notify said host of execution of the erasure, when said data development step ends.

7. The non-transitory recording medium according to claim 5, wherein:

in said update step, processing of changing a file attribute of said one instruction file which is stored and held in said one second memory area, and which is regarded as the analysis target, is performed when said data development step ends.

8. The non-transitory recording medium according to claim 7, wherein:

in said update preparation step, processing of changing said one instruction file which is stored and held in said one second memory area, and which is regarded as the analysis target, is performed from a read-only file attribute to a readable and writable file attribute, when said data development step ends.

9. A print processing method executed by a printer that includes memory having a regular storage area which a host connected to a USB port is able to recognize as a removable drive; and a printing device configured to perform printing based on print data produced by an application program, wherein said regular storage area includes: a first memory area in which an executable file of said application program is stored; and a plurality of second memory areas in which a plurality of instruction files including said print data are able to be written respectively, said memory further includes a print buffer area capable of temporarily storing said print data extracted from said instruction file, when the executable file of said application program is read and executed by said host, said print processing method executing a plurality of steps, said plurality of steps including:

a first step for executing first file write processing for updating a content of one of the original instruction file stored in any one of the plurality of second memory areas by writing one preceded instruction file received from said host in said one second memory area;

a second step for executing first print data extraction processing for analyzing the one preceded instruction file written in the one second memory area by said first file write processing and extracting said print data corresponding to the preceded instruction file;

a third step for executing first data development processing for developing the print data corresponding to the one preceded instruction file extracted by said first print data extraction processing in said print buffer area and for executing first update preparation processing for enabling to be updated later said one preceded instruction file which is stored and held in said one second memory area while concurrently performing the first data development processing after the data development;

a fourth step for executing first print processing for making said printing device execute printing of said print data corresponding to the one preceded instruction file developed in said print buffer area by said first data development processing and for executing second file write processing for updating a content of the one preceded instruction file into a content of one subsequent instruction file by writing the one subsequent instruction file received form said host in any one of the plurality of said second memory areas while concurrently performing the first print processing, said one preceded instruction file being stored in the one of second memory areas as being capable of updating by said first update preparation processing;

a fifth step for executing second print data extraction processing for analyzing the one subsequent instruction file written in the one second memory area by said second file write processing and extracting said print data corresponding to the subsequent instruction file;

a sixth step for executing second data development processing for developing the print data corresponding to the one subsequent instruction file extracted by said second print data extraction processing in said print buffer area and for executing second update preparation processing for enabling to be updated later said one subsequent instruction file which is stored and held in said one second memory area while concurrently performing the second data development processing after the data development; and a seventh step for executing second print processing for making said printing device execute printing of said print data corresponding to the one subsequent instruction file developed in said print buffer area by said second data development processing and for executing third file write processing for updating the content to the one subsequent instruction filed into a content of a further-subsequent instruction file by writing the one further-subsequent instruction file received from said host in any one of the plurality of said second memory areas while concurrently performing the second print processing, said one subsequent instruction file being stored in the one of second memory areas and being capable of updating by said second update preparation processing.

10. The print processing method according to claim 9, wherein:

in said update step, processing of erasing said one instruction file which is stored and held in said one second memory area, and which is regarded as the analysis target, is performed as well as producing a notification file to notify said host of execution of the erasure, when said data development step ends.

11. The print processing method according to claim 9, wherein:

in said update step, processing of changing a file attribute of said one instruction file which is stored and held in said one second memory area, and which is regarded as the analysis target, is performed when said data development step ends.

12. The print processing method according to claim 11, wherein:

in said update preparation step, processing of changing said one instruction file which is stored and held in said one second memory area, and which is regarded as the analysis target, is performed from a read-only file attribute to a readable and writable file attribute, when said data development step ends.

* * * * *